United States Patent [19]

Fisher, III et al.

[11] 4,010,979

[45] Mar. 8, 1977

[54] LATCH STRUCTURE FOR VEHICLE SEATS

[76] Inventors: Alfred J. Fisher, III, 9 Stratford Place, Grosse Point, Mich. 48230; Cecil A. Collins, 1355 Edgeorge Drive, Pontiac, Mich. 48054

[22] Filed: May 24, 1976

[21] Appl. No.: 689,033

[52] U.S. Cl. .............................................. 297/379
[51] Int. Cl.² ..................................... B60M 1/02
[58] Field of Search .................................... 297/379

[56] References Cited

UNITED STATES PATENTS

| | | | |
|---|---|---|---|
| 3,549,202 | 12/1970 | Boschen et al. | 297/379 |
| 3,628,831 | 12/1971 | Close | 297/379 |
| 3,848,923 | 11/1974 | Dehler | 297/379 |

*Primary Examiner*—Francis K. Zugel
*Attorney, Agent, or Firm*—Harness, Dickey & Pierce

[57] ABSTRACT

The disclosure relates to an inertia operated latch structure for preventing forward movement of a pivoted vehicle seat back upon impact or sudden deceleration. The latch structure comprises a primary inertia member supported for pivotal movement between a normal released position and an inertia induced locked position. The primary inertia member includes a track in which a secondary inertia member is positioned. The primary inertia member is movable from a normal position to an inertia induced position upon sudden deceleration and is maintained in this latter condition by the secondary inertia member.

5 Claims, 7 Drawing Figures

U.S. Patent  Mar. 8, 1977  Sheet 1 of 2  4,010,979
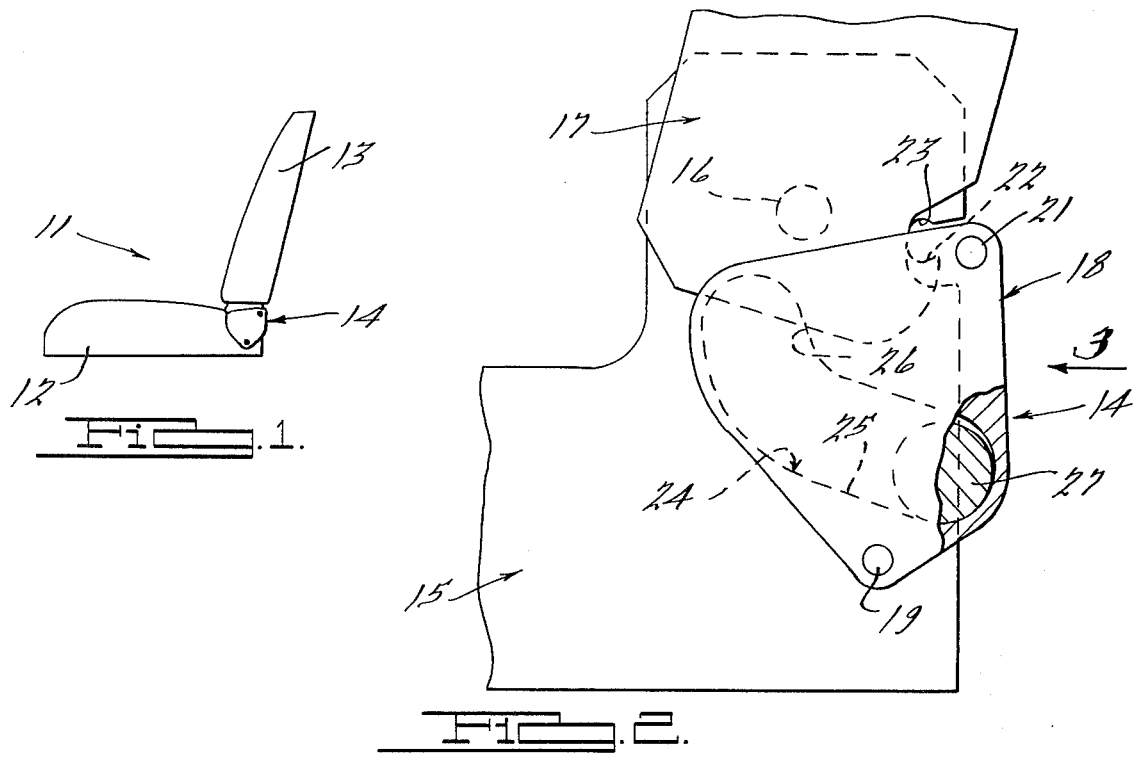
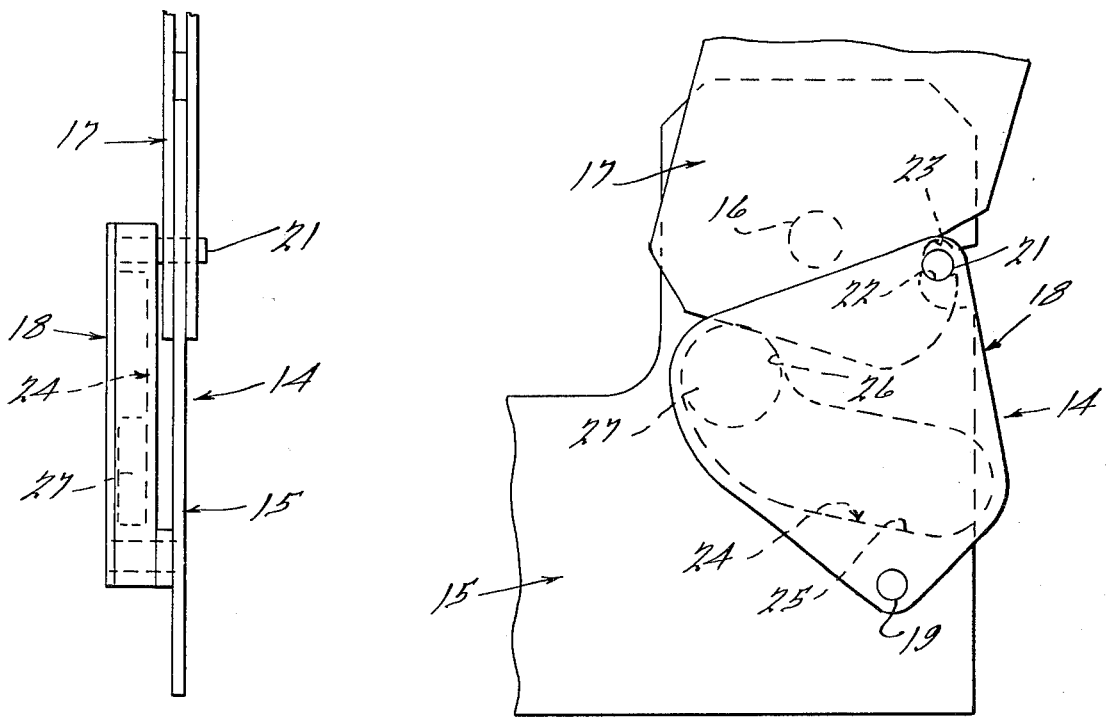

LATCH STRUCTURE FOR VEHICLE SEATS

BACKGROUND OF THE INVENTION

The invention relates to a latch structure and, more particularly, to an improved inertia operated latch structure for preventing pivotal movement of a vehicle seat back upon impact or sudden deceleration.

It is well recognized that the likelihood of injury to occupants is reduced if the pivoted seat back commonly used in two-door motor vehicles is held against pivotal movement upon impact. While it has been common to provide manually operated latch structures for holding the seat back against movement, such manually operated latches are inconvenient in that they must be released prior to entry to the rear seat of the vehicle. To overcome this defect, it has been proposed to employ inertia operated latches that will hold the seat back against its pivotal movement only upon sudden vehicle deceleration. Such latches must be fool-proof in operation to insure complete safety, and consistent with this requirement, the latch should be of simple construction.

It is, therefore, a principal object of this invention to provide an improved latch structure particularly adapted for preventing forward movement of a seat back during sudden deceleration.

It is another object of this invention to provide an improved, simplified inertia operated latch.

It is a further object of this invention to provide an inertia operated latch that will be maintained in the latched position for a substantial time after the deceleration force has ceased.

SUMMARY OF THE INVENTION

This invention is adapted to be embodied in a latch structure for preventing movement of a vehicle seat back or the like during sudden decelerations. The latch structure comprises a floor or seat mounted support bracket, a seat mounted latching member and a cooperating primary inertia member. The primary inertia member is movable upon deceleration of the vehicle from a normal released position to a latched position. The primary inertia member includes a track in which a secondary inertia member is movable. When the secondary inertia member moves to its inertia induced position, it is operable to hold primary inertia member in the latched position.

BRIEF DESCRIPTION OF THE DRAWINGS

FIG. 1 is a side elevational view of the vehicle seat structure embodying this invention.

FIG. 2 is an enlarged side elevational view, with a portion broken away and other portions removed, of the seat shown in FIG. 1, showing the details of the latch structure.

FIG. 3 is an end elevational view taken generally in the direction of the arrow 3 in FIG. 2.

FIG. 4 is a side elevational view, in part similar to FIG. 2, showing the structure in its latched position.

DETAILED DESCRIPTION OF THE PREFERRED EMBODIMENTS

Figure 5:
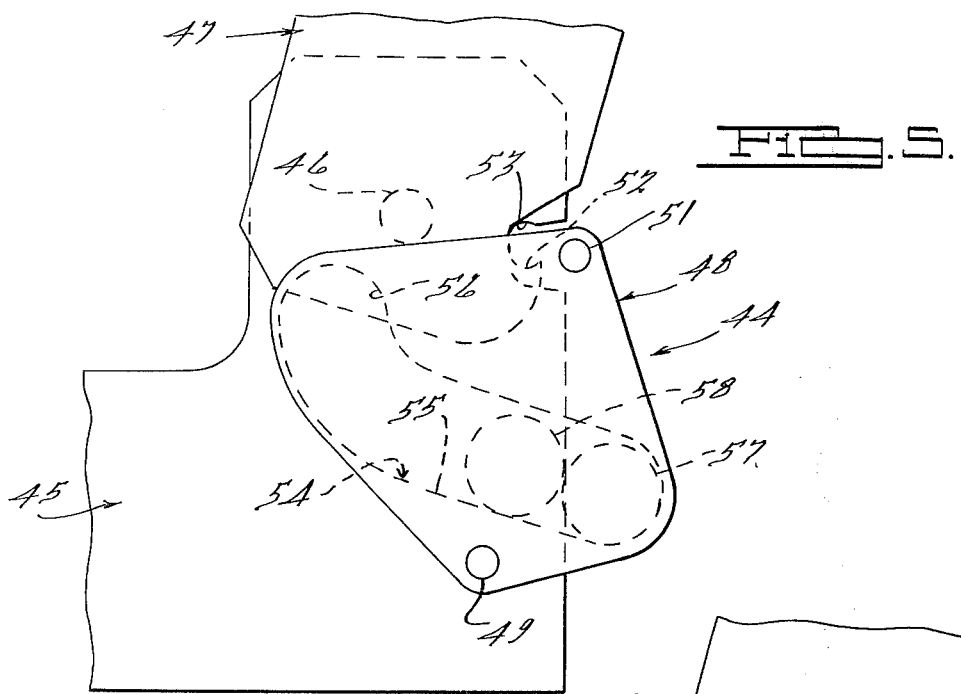
FIG. 5 is a side elevational view, in part similar to FIG. 2, showing another embodiment of the invention.

FIG. 1 shows, in a generally schematic fashion, a vehicle seat assembly, indicated generally by the reference numeral 11, incorporating a latch structure constructed in accordance with a first embodiment of this invention. The seat structure 11 is of the type conventionally found in the front seat of a two-door motor vehicle and comprises a seat cushion 12 and a seat back 13. The seat back 13 is supported for pivotal movement relative to the seat cushion 12 in any known manner so as to permit access to the rear seat of the associated vehicle (not shown). A latch structure, indicated generally by the reference numeral 14, is provided for preventing pivotal movement of the seat back 13 under sudden decelerations.

The construction of the latch structure 14 may be best understood by reference to FIGS. 2 through 4. In these Figures, the upholstery of the seat cushion 12 and seat back 13 has been deleted and only the portion of the structural components of these elements has been illustrated to permit understanding of the invention. Affixed to the frame or forming a portion of the frame of the seat cushion 12 is a generally L-shaped bracket 15. The bracket 15 pivotally supports the outer edge of the seat back by means of a pivot pin 16 that cooperates with a latching member 17 of the seat back 13.

The latch structure 14 is comprised of a pivotally supported primary inertia member 18 that may be formed from a body of plastic material or the like. The member 18 is pivotally supported upon the bracket 15 by means of a pivot pin 19. The upper end of the primary inertia member 18 carries an inwardly projecting latch pin 21 that is adapted to cooperate with a hook-shaped recess 22 formed in the seat back latching member 17 and a complimentary recess 23 formed in the bracket 15, as will become apparent. It is to be noted that the pin 21 extends across two spaced elements of the latching member 17 so that load thereon is evenly distributed on opposite sides of the bracket 15 and minimum load is placed on the primary inertia member 18.

The primary inertia member 18 is formed with an internal track 24 comprised of a first generally straight section 25 and an arcuate delay section 26. A generally disk-shaped secondary inertia member 27 is positioned in the track 24 and is rollable therealong, as will become apparent.

FIG. 2 shows the latch structure 14 in its unlatched condition. In this condition, the secondary inertia member 27 is positioned to the right of the pivot pin 19 that supports the member 18. This may be considered a normal position. In this position, the weight of the primary inertia member 18 and the positioning of the secondary inertia member 27 causes the member 18 to be pivoted in a clockwise direction to a normal released position. AS such, the seat back 13 may be pivoted freely relative to the seat cushion 12 about the pivot pin 16.

If the associated vehicle decelerates suddenly or is driven rearwardly, as might occur when a standing vehicle is struck head-on by a vehicle traveling in the opposite direction, the primary inertia member 18 immediately pivots to the position shown in FIG. 4. The secondary inertia member 27 thereafter rolls along the track 24. As the secondary inertia member 27 passes along the straight track portion 25, it effects a counterclockwise bias on the primary inertia member 18 preventing rebound thereof. The amount of travel of the secondary inertia member 27 along the track 24 will depend upon the magnitude and duration of the impact. If sufficiently great, the inertia member 27 will traverse beyond the straight portion 25 and pass into the portion 26 (FIG. 4).

In the latched position, the latch pin 21 is trapped between the recess 22 on the seat back latching member 17 and the recess 23 on the fixed bracket 15. As such, pivotal movement of the seat back 13 about the pivot pin 16 is precluded.

The primary inertia member 18 will be held in this position until the secondary inertia member 17 returns to the position shown in FIG. 2. The necessary rolling movement of the secondary inertia member 27 and the configuration of the track 24 and, particularly, the delay portion 26 will add sufficient time delay to prevent premature release of the seat back 13.

FIG. 5 shows another embodiment of the invention incorporating additional means to provide a time delay. In this embodiment, the latching structure is identified generally by the reference numeral 44. Again, the latching structure 44 cooperates with a seat cushion bracket 45 and a seat back frame member 47 that is pivotally supported by means of a pivot pin 46.

The latch structure 44 includes a primary inertia member 48 that is pivotally supported on the frame 45 by means of a pivot pin 49. The inertia member 48 includes a latching pin 51 that is adapted to cooperate with a hook-shaped portion 52 of the seat back frame 47 and a complimentary recess 53 of the seat cushion bracket 45.

As in the preceding embodiment, the inertia member 48 is formed with an elongated track 54 having a straight section 55 and an arcuate delay section 56. In distinction to the preceding embodiment, a pair of secondary inertia members 57 and 58 are positioned in the track 54.

The operation of the embodiment of FIG. 5 is substantially the same as that of the previously described embodiment. In the normal mode, as shown in the Figure, the secondary inertia members 57 and 58 are at their normal position and cause the primary inertia member 48 to be pivoted clockwise to a released position. Upon inertia forces experienced by sudden decelerations, the primary inertia member 48 first pivots to the position shown in FIG. 4, the inertia members 57 and 58 thereafter rolling along the track portions 55 and 56 to retain the member 48 in its latched position. In this position, the pin 51 will cooperate with the portions 52 and 53 to prevent pivotal movement of the seat back.

The use of the two secondary inertia members 57 and 58 provides further time delay to the release of the latch structure 44. This increased time delay results from the inter-part rolling friction between the secondary inertia members 57 and 58. Again, the track delay section 56 also cooperates to this result.

Figures 6, 7:
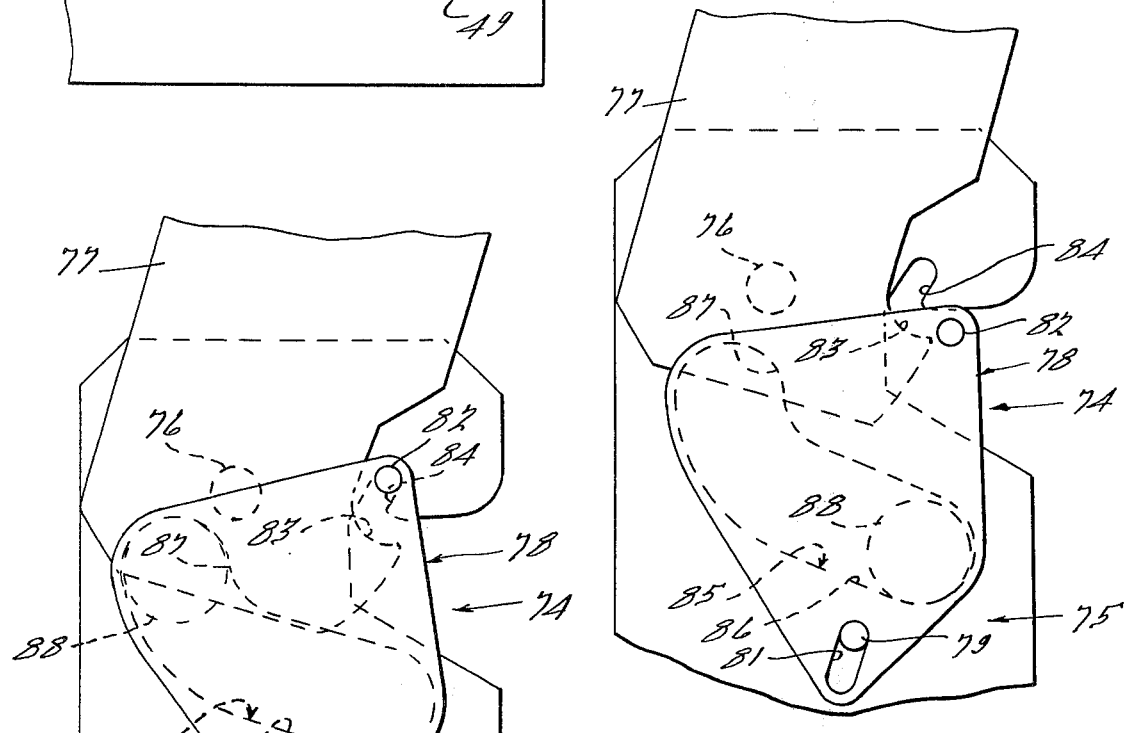
FIG. 6 is a side elevational view, in part similar to FIGS. 2 and 5, showing a further embodiment of the invention.
FIG. 7 is a side elevational view of the latch structure shown in FIG. 6 in its latching position.

FIGS. 6 and 7 show another embodiment of the invention incorporating a different structure for achieving the added time delay. In this embodiment, the latch structure is identified generally by the reference numeral 74. The latch structure 74 cooperates with a seat cushion frame member 75 which supports the seat back by means of a pivot pin 76. The seat back includes a seat back frame member 77.

The latch structure 74 includes a primary inertia member 78 supported for pivotal and sliding movement relative to the seat cushion frame member 75 by means of a pivot pin 79 that enters into an elongated slot 81 of the member 78. The member 78 carries a latch pin 82 that cooperates with a hook-shaped recess 83 formed in the seat back frame member 77 and an elongated slot 84 formed in the seat frame member 75.

The primary inertia member 78 is also formed with an elongated track 85 which, as in the previously described embodiments, comprises a straight portion 86 and a curved delay portion 87. A secondary inertia member 88 is rollably supported in the track 85.

FIG. 6 illustrates the mechanism in its released position. In this condition, the primary inertia member 78 is pivoted in a clockwise direction so that the pin 82 is free of the slots 83 and 84. Free pivotal movement of the seat back is then permitted. At the same time, the member 78 will have moved downwardly so that the pin 79 is at the upper end of the slot 81.

Upon impact, the primary inertia member 78 moves in a counterclockwise direction and the secondary inertia member 88 thereafter rolls along the track 85. If sufficient impact is experienced, the member 78 will move upwardly, as permitted by the length of the slot 81 so that the pin 88 enters into the slot 84. Upon release, the member 78 must slip downwardly, thus adding to the time delay afforded by the delay portion 87 of the track 85.

It should be readily apparent that each of the disclosed embodiments provides a highly effective inertia latching member that prevents unwarranted seat back movement. In each embodiment a relatively light and easily rotated primary inertia member pivots to a latch position upon deceleration of the vehicle. Thereafter, the rolling secondary inertia member maintains a bias on the primary inertia member to the latch condition. The secondary inertia members are initially disposed relatively close to the axis of rotation of the primary inertia member to minimize the inertia force necessary to effect movement thereof. Return movement of the secondary inertia members automatically opens the latch.

Moreover, as best seen in the embodiment illustrated in FIG. 3, the pin 21 extends between spaced portion of the member 17 so as to be engaged by the fixed bracket 15 therebetween. Accordingly, the pin 21 is loaded in a manner that does not transfer a bending or torsional moment to the primary inertia member 18.

It is to be understood that the foregoing description is that of a preferred embodiment of the invention. Various changes and modifications may be made without departing from the spirit and scope of the invention as defined by the appended claims.

We claim:

1. A latch structure for preventing movement of a vehicle seat back relative to the vehicle seat during deceleration of the vehicle, said latch comprising a bracket on said seat having a first latching recess therein, a latching member on said seat back having a second latching recess therein, a primary inertia member having a latch pin thereon engageable in said first and second latching recesses to preclude relative movement of said bracket and latching member, said primary inertia member being movable due to inertia forces from an unlatched position to a latched position upon the occurrence of said deceleration, said primary inertia member having a track therein, and a secondary inertia member movable along said track from a normal position to an inertia induced position, said secondary inertia member being operable to maintain said primary inertia member in a latched position after movement of said secondary inertia member from its normal position along said track toward the inertia induced position.

2. A latch structure as set forth in claim 1 wherein the secondary inertia member comprises a rolling member supported for rolling movement along the track.

3. A latch structure as set forth in claim 2 further including means for delaying movement of the primary inertia member from its latched position to its released position upon the termination of deceleration forces.

4. A latch structure as set forth in claim 1 wherein the latching member on said seat back comprises a pair of spaced elements and the bracket on said seat extends therebetween, the pin on said primary inertia member extending between said pair of elements so as to be engageable by said bracket at a point between the points of engagement of said pin with said elements.

5. A latch structure as set forth in claim 1 wherein the primary inertia member is supported for pivotal movement between a normal position and a latched position.

* * * * *